(12) United States Patent
Piccirillo et al.

(10) Patent No.: US 8,826,098 B2
(45) Date of Patent: Sep. 2, 2014

(54) DATA SIGNATURES TO DETERMINE SUCCESSFUL COMPLETION OF MEMORY BACKUP

(75) Inventors: Gary J. Piccirillo, Cypress, TX (US); Peter B. Chon, Cypress, TX (US)

(73) Assignee: LSI Corporation, San Jose, CA (US)

(*) Notice: Subject to any disclaimer, the term of this patent is extended or adjusted under 35 U.S.C. 154(b) by 281 days.

(21) Appl. No.: 13/104,624

(22) Filed: May 10, 2011

(65) Prior Publication Data

US 2012/0159289 A1 Jun. 21, 2012

Related U.S. Application Data

(60) Provisional application No. 61/424,701, filed on Dec. 20, 2010.

(51) Int. Cl.
*G11C 29/38* (2006.01)
*G01R 31/28* (2006.01)

(52) U.S. Cl.
USPC .......................................... 714/763; 714/732

(58) Field of Classification Search
CPC .............. G06F 11/277; G06F 2201/83; G06F 11/1016; G01R 31/31705
USPC .................................................. 714/763, 732
See application file for complete search history.

(56) References Cited

U.S. PATENT DOCUMENTS

| | | | |
|---|---|---|---|
| 4,827,478 A * | 5/1989 | Chan | 714/763 |
| 6,968,478 B1 * | 11/2005 | Edwards et al. | 714/32 |
| 7,996,731 B2 * | 8/2011 | Macri et al. | 714/52 |
| 8,225,182 B2 * | 7/2012 | Kagan et al. | 714/776 |
| 2006/0015683 A1 | 1/2006 | Ashmore et al. | |

* cited by examiner

*Primary Examiner* — James C Kerveros
(74) *Attorney, Agent, or Firm* — Alexander J. Neudeck; Cochran Freund & Young LLC

(57) ABSTRACT

Disclosed is a power isolation and backup system. When a power fail condition is detected, temporary storage is flushed to an SDRAM. After the flush, interfaces are halted, and power is removed from most of the chip except the SDRAM subsystem. The SDRAM subsystem copies data from an SDRAM to a flash memory. On the way, the data may be encrypted, and/or a data integrity signature calculated. If an error is detected, a data integrity signature may be corrupted. A completion signature may be written. To restore data, the SDRAM subsystem copies data from the flash memory to the SDRAM. On the way, the data being restored may be decrypted, and/or a data integrity signature and completion signature checked.

20 Claims, 10 Drawing Sheets

DATA SIGNATURES TO DETERMINE SUCCESSFUL COMPLETION OF MEMORY BACKUP

CROSS-REFERENCE TO RELATED APPLICATION

The present patent application is based upon and claims the benefit of U.S. Provisional Patent Application Ser. No. 61/424,701, filed on Dec. 20, 2010, by Peter B. Chon, entitled "Low Power Hardware Controlled Memory Backup that includes Encryption and Signature Generation," which application is hereby specifically incorporated herein by reference for all that it discloses and teaches. This application is related to the following U.S. patent application Ser. No. 13/081,095, filed Apr. 6, 2011, Ser. No. 13/083,394, filed Apr. 8, 2011, and Ser. No. 13,083,407, filed Apr. 8, 2011.

BACKGROUND OF THE INVENTION

All or most of the components of a computer or other electronic system may be integrated into a single integrated circuit (chip). The chip may contain various combinations of digital, analog, mixed-signal, and radio-frequency functions. These integrated circuits may be referred to as a system-on-a-chip (SoC or SOC). A typical application is in the area of embedded systems. A variant of a system on a chip is the integration of many RAID functions on a single chip. This may be referred to as RAID on a chip (ROC).

RAID arrays may be configured in ways that provide redundancy and error recovery without any loss of data. RAID arrays may also be configured to increase read and write performance by allowing data to be read or written simultaneously to multiple disk drives. RAID arrays may also be configured to allow "hot-swapping" which allows a failed disk to be replaced without interrupting the storage services of the array. The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of increasing data integrity in at least one of a plurality of data blocks stored in a nonvolatile memory, comprising: receiving a first command data block having a first plurality of bits that indicate a first location in said volatile memory and a second plurality of bits that indicate a first selected data signature engine; transferring at least a portion of a first one of said plurality of data blocks from said volatile memory to said selected data signature engine; generating, in said first selected data signature engine, a first data integrity signature based on said at least said portion of said first one of said plurality of data blocks transferred from said volatile memory; in response to an indicator of an error, corrupting said first data integrity signature to create a corrupted data signature; receiving said corrupted data signature from said first selected data signature engine; and, transferring said corrupted data signature to said nonvolatile memory.

An embodiment of the invention may therefore further comprise a method of transferring data between a nonvolatile memory and a volatile memory, comprising: receiving a command data block having a memory address field, said memory address field having a first plurality of bits that indicate a location in said volatile memory and a second plurality of bits that indicate a data signature engine; based on said indicated data signature engine, transferring data from said volatile memory to said indicated data signature engine; receiving an error indicator; based on said error indicator, corrupting an interim data signature value associated with said indicated data signature engine; and, transferring a data signature based on said corrupted interim data signature value to said nonvolatile memory.

An embodiment of the invention may therefore further comprise an integrated circuit, comprising: a data signature engine, a first data integrity signature based on at least portion of a first one of a plurality of data blocks transferred from a volatile memory; a data manipulation controller that receives a first command data block having a first plurality of bits that indicate a first location in said volatile memory and a second plurality of bits that indicate said data signature engine, said data manipulation controller, in response to an indicator of an error, to corrupt said first data integrity signature to create a corrupted data signature; a volatile memory controller to be coupled to a volatile memory, said volatile memory controller to facilitate the transfer of data from said volatile memory to said data signature engine; and, a nonvolatile memory controller to be coupled to said nonvolatile memory, the nonvolatile memory controller to receive said corrupted data signature from said data signature engine and transfer said corrupted data signature to said nonvolatile memory.

DETAILED DESCRIPTION OF THE EMBODIMENTS

Figure 1:
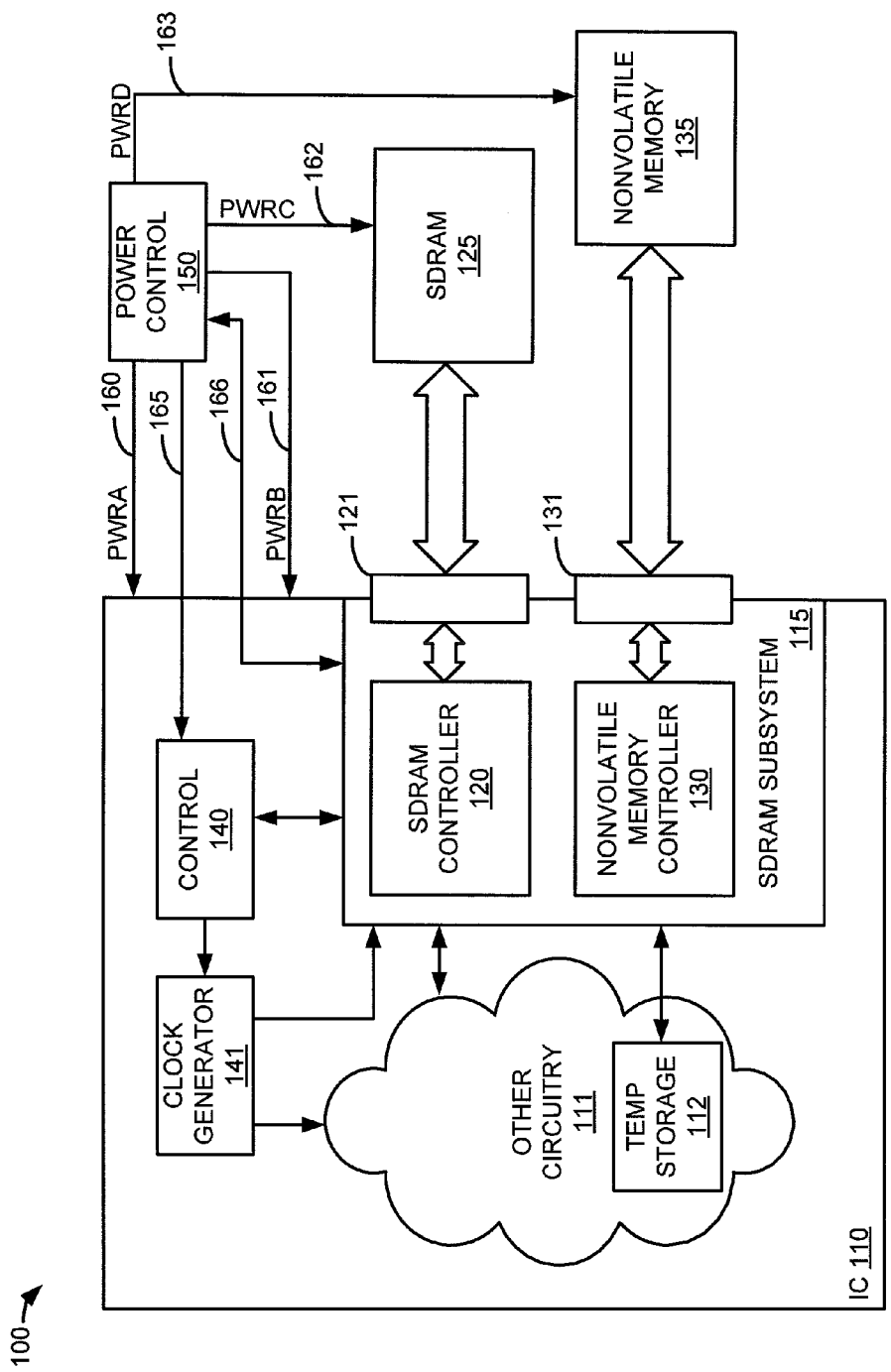
FIG. 1 is a block diagram of a power isolation and backup system.

FIG. 1 is a block diagram of a power isolation and backup system. In FIG. 1, isolation and backup system 100 comprises: integrated circuit 110, power control 150, SDRAM 125, and nonvolatile memory (e.g., flash) 135. Integrated circuit (IC) 110 includes SDRAM subsystem 115, control 140, clock generator 141 and other circuitry 111. SDRAM subsystem 115 includes SDRAM controller 120 and nonvolatile memory controller 130. Other circuitry 112 may include temporary storage 112 (e.g., cache memory, buffers, etc.). SDRAM controller 120 interfaces with and controls SDRAM 125 via interface 121. Nonvolatile memory controller 130 interfaces with and controls nonvolatile memory 135 via interface 131. SDRAM subsystem 115 (and thus SDRAM controller 120 and nonvolatile memory controller 130) is operatively coupled to control 140, clock generator 141, other circuitry 111, and temporary storage 112. Clock generator 141 is operatively coupled to control 140 and other circuitry 111.

Power control 150 provides power supply A (PWRA) 160 to IC 110. Power control 150 provides power supply B (PWRB) 161 to SDRAM subsystem 115. Power control 150 provides power supply C (PWRC) 162 to SDRAM 125. Power control 150 provides power supply D (PWRD) 163 to nonvolatile memory 135. Power control 150 provides a power fail signal 165 to control 140. Power control 150 is also operatively coupled to SDRAM subsystem by signals 166.

It should be understood that as used in this application SDRAM (Synchronous Dynamic Random Access Memory) is intended to include all volatile memory technologies. Thus, SDRAM subsystem 115 may, in an embodiment, comprise a Static Random Access Memory (SRAM) controller and SDRAM 125 may comprise a SRAM device.

In an embodiment, when power control 150 detects a power failure condition (either impending power failure or existing power failure) power control 150 notifies IC 110 of the condition via a power fail signal 165. This will starts a power isolation sequence to isolate SDRAM subsystem 115 from the rest of IC 110, and other circuitry 111, in particular. In an embodiment, the entire power isolation sequence is controlled by hardware (e.g., control 140, SDRAM subsystem 115, or both) with no interaction from software.

Upon receiving notification of a power fail condition, all of the interfaces (e.g., interfaces to other circuitry 111) connected to SDRAM subsystem 115 will be halted. On-chip temporary storage 112 will be flushed. It should be understood that although, in FIG. 1, temporary storage 112 is shown outside of SDRAM subsystem 115, temporary storage 112 may be part of SDRAM subsystem 115. In an example, temporary storage 112 may be a cache (e.g., level 1 cache, level 2 cache, level 3 cache), a posting buffer, or the like.

Once temporary storage 112 has been flushed, logic connected to SDRAM subsystem 115 indicates when the interfaces used for the flushes have halted. Once halted, these interfaces are not accepting any new cycles. Once all of the interfaces are halted, inputs that are required for external devices and internal core logic (i.e., other circuitry 111) are latched so that their state will not be lost when isolation occurs. Clocks that are not needed after the inputs are latched are gated off. The SDRAM subsystem will switch to internally generated clocks, or to clocks generated by a clock generator that shares power with SDRAM subsystem 115 (e.g., clock generator 141). Following this, inputs to SDRAM subsystem 115 not required for memory backup are isolated. In an embodiment, these inputs are driven to an inactive state.

After isolation of the inputs completes, SDRAM subsystem 115 (or control 140) signals (for example, using signals 166) power control 150 to remove PWRA 160. This results in power being turned off to all of IC 110 other than SDRAM subsystem 115. SDRAM subsystem 115 is on a separate power plane from at least other circuitry 111. This allows power to be maintained (i.e., by PWRB 161) to the SDRAM subsystem until power is totally lost to isolation and backup system 100.

In addition to controlling the isolation and removal of power to all but the SDRAM subsystem 115 (and any other logic needed by SDRAM subsystem 115), once the interfaces have halted and temporary storage 112 been flushed, internal memory backup logic will start moving data from SDRAM 125 to nonvolatile memory 135. In an embodiment, these are the only cycles running on the entire chip once PWRA has been removed.

FIG. 1 illustrates connections between IC 110 chip and external logic along with some of the internal connections that may be used for power isolation and subsequent memory backup. When the power control 150 detects a power failure, it notifies IC 110 via power fail signal 165. Control 140 monitors power fail signal 165. When control 140 sees power fail signal 165 asserted, and the power isolation is enabled to be done, control 140 notifies SDRAM subsystem 115 to begin an isolation sequence by asserting a power_iso_begin signal (not explicitly shown in FIG. 1). SDRAM subsystem 115 then performs steps required for the power isolation sequence. The steps included in the power isolation sequence are explained in greater detail later in this specification.

Once the power isolation sequence has completed, a MSS-_core_iso_ready signal (not explicitly shown in FIG. 1) is asserted to indicate that at least PWRA 160 can be removed. Power control 150 disables PWRA 160, but will keeps PWRB 161, PWRC 162, and PWRD 163 enabled. Disabling PWRA 160 removes power from portions of IC 110 other than circuitry that is connected to PWRB 161. SDRAM subsystem 115 along with associated phase locked loops (e.g., internal to clock generator 141) and IO's (e.g., interfaces 121 and 131) are on a different power plane than the rest of IC 110. This plane is powered by PWRB 161 and will remain enabled. In an example, the functional blocks that have at least a portion of their circuitry on this separate power plane are control 140, clock generator 141, and SDRAM subsystem 115. In an embodiment, an external SDRAM 125 remains powered by PWRC 162 and an external nonvolatile memory remains powered by PWRD 163. This is a reduced amount of logic that must remain powered in order for the memory backup to be performed.

During the power isolation sequence, SDRAM subsystem 115 begins an SDRAM 125 memory backup at an appropriate time. This backup moves required (or requested) data from SDRAM 125 to nonvolatile memory 135. In an embodiment, the entire memory backup is performed without software intervention.

It should be understood that the methods discussed above and illustrated in part by FIG. 1 for supplying power supplies 160-163 are exemplary ways for supplying (and removing) power to one or more components of isolation and backup system 100. In the illustrated examples, all the power supplies 160-163 and control of the various power domains/planes is done externally to IC 110. However, there are other methods for supplying (and removing) power to one or more components of isolation and backup system 100. One method may use a single external power source per voltage and then create the different power domains/planes using switches internal to IC 110. Another method may reduce the number of external voltages, and use regulators internal to one or more components of isolation and backup system 100 (e.g., IC 110) to get various voltages along with switches internal to IC 110 to control the different power domains/planes. With these methods, power isolation is done approximately the same way. A difference is that power control logic 150 that needs to be notified to keep power supplies 161-163 enabled may be located internally or externally.

Figure 2:
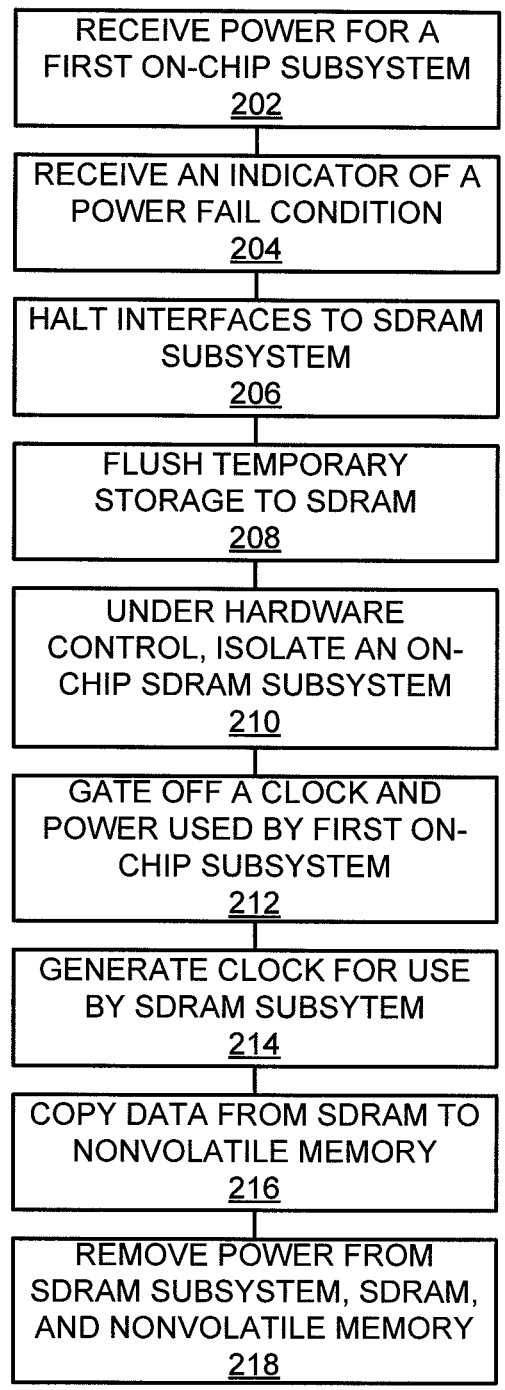
FIG. 2 is a flowchart of a method of power isolation.

FIG. 2 is a flowchart of a method of power isolation. The steps illustrated in FIG. 2 may be performed by one or more elements of isolation and backup system 100. Power is received for a first on-chip subsystem (202). For example, PWRA 160, which powers other circuitry 111, may be received by IC 100. An indicator of a power fail condition is received (204). For example, power fail signal 165 may be received by IC 110. This may result in the power isolation sequence beginning when a power_iso_begin signal is asserted.

Interfaces to an SDRAM subsystem are halted (206). Temporary storage is flushed to SDRAM (208). For example, a level-3 cache, level-2 cache, posting buffer, or any other type of memory storage that is used to temporarily store a copy of the data to/from SDRAM 125 may be flushed. Logic connected to each of the interfaces may return a halt indication when they have completed all outstanding cycles and stopped accepting any new ones.

Under hardware control, an on-chip SDRAM subsystem is isolated (210). For example, when the SDRAM interface (or temporary storage 112) has indicated it has halted accepting cycles, its inputs will be isolated by setting them to inactive states. Once halts from the other interfaces are received, inputs that need to be preserved for external core devices and internal logic are latched. These inputs include such things as resets, signals for the PLL and strap inputs. At this point in time, any clocks that are not needed by the SDRAM subsystem anymore may be gated off to assist in reducing power consumption. Some amount of time later, a signal (e.g., MSS_core_iso_enable) may be asserted which will indicate to isolate all of the inputs to the SDRAM subsystem and set them to their inactive state.

A clock and power used by a first on-chip subsystem is gated off (212). For example, the clock going to temporary storage 112 may be switched to an internally generated clock. Once the inputs have been isolated, a signal (e.g., MSS_core_iso_ready) may be asserted. This indicates, to the power control logic 150, for example, that PWRA 160 connected to IC 110 can now be disabled.

A clock for use by the SDRAM subsystem is generated (214). For example, clock generator 141 may generate a clock for use by the SDRAM subsystem to be used when PWRA 160 is off. Data is copied from SDRAM to nonvolatile memory (216). For example, the memory backup from SDRAM 125 to nonvolatile memory 135 may start by asserting a signal (e.g., flash_offload_begin). Power is removed from the SDRAM subsystem, SDRAM, and nonvolatile memory (218). For example, either under the control of power control 150 upon the completion of memory backup, or simply because power to the entire isolation and backup system 100 has failed, power is removed from SDRAM subsystem 115, SDRAM 125, and nonvolatile memory 135.

An advantage to isolating the power of SDRAM subsystem 115 during backup is a reduced amount of power is consumed. Only the logic inside of IC 110 that handles the memory backup, external SDRAM 125, and nonvolatile memory 135 are powered. By reducing the power consumption, it increases the amount of time available to perform the memory backup before all of the remaining power is consumed. Having more time allows for more memory to be backed up in addition to less external logic being required to maintain the power until the backup is completed. Because the power isolation is being done, it may be advantageous to move the flash controller internally to reduce power consumption and overall system cost required to do memory backup.

In an embodiment, additional data protection is provided for the data that is backed up by performing encryption and/or a data integrity signature calculation as the data in SDRAM 125 is moved to nonvolatile memory 135. Encryption of data provides a secure method of storing the data. Data integrity signature calculation protects against most data errors likely to occur.

SDRAM subsystem 115 moves data between SDRAM 125 and nonvolatile memory 135 when a memory backup or restore is required. SDRAM subsystem 115 may use a list of CDBs (Command Descriptor Blocks) for indicating the data movement that is requested. The format of these CDBs is typically pre-defined. One of the fields in a CDB is a memory address field that indicates where in SDRAM 125 to read or write data. In an embodiment, the number of address bits provided in this field exceeds the number that is required to address all of SDRAM 125. Some of these address bits that are not required may be used to encode information on how the data should be manipulated as it is moved from/to SDRAM 125. This movement may occur when a memory backup or restore is performed, or at other times. The encoding of the unused address bits may indicate if the data should be encrypted/decrypted, if signature generation is required, if the signature should be offloaded or reset, and which signature engine to use.

When a request from nonvolatile memory controller 130 is received to read/write SDRAM 125, the aforementioned unused address bits may be interpreted to determine what data manipulation to perform as the data moves between SDRAM 125 and nonvolatile memory 135, via SDRAM subsystem 115.

Figure 3A:
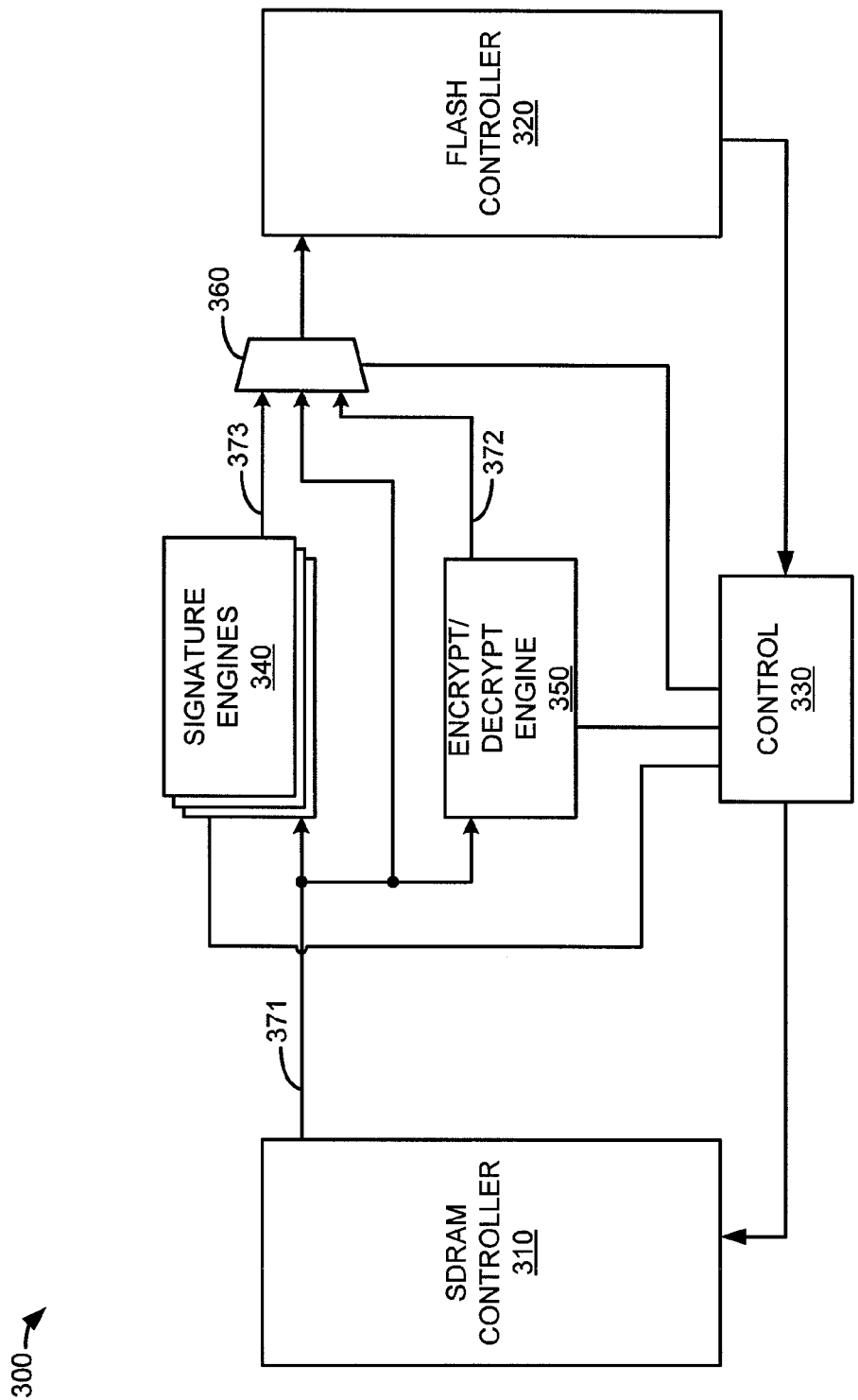
FIGS. 3A and 3B are block diagrams of data manipulation system configurations.
Figure 3B:
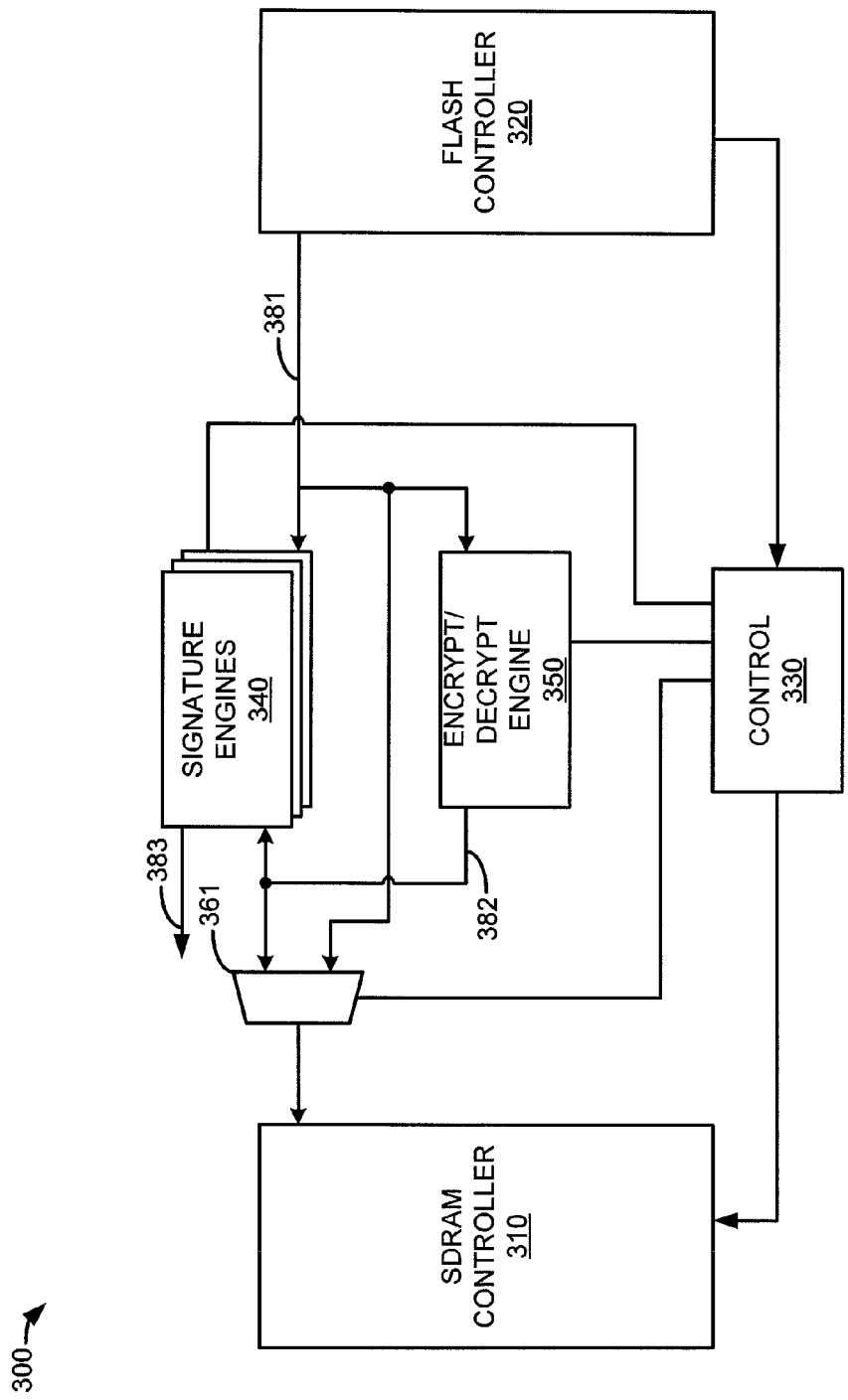

In an embodiment, FIGS. 3A and 3B are a block diagrams of data manipulation system configurations. In FIG. 3A, data manipulation system 300 comprises: SDRAM controller 310, flash controller 320, control 330, signature engines 340, encrypt/decrypt engine 350, and multiplexer (MUX) 360. Control 330 is operatively coupled to SDRAM controller 310, flash controller 320, signature engines 340, and encrypt/decrypt engine 350, and MUX 360. Thus, control 330 may receive commands, signals, CDBs, etc. from flash controller 320, perform arbitration, and otherwise manage the data flows and configuration of data manipulation system 300.

In FIG. 3A, SDRAM 310 is configured, via coupling 371, to send data read from an SDRAM (not shown in FIG. 3A) to signature engines 340, encrypt/decrypt engine 350, and a first input of MUX 360. Encrypt/decrypt engine 350 is configured, via coupling 372, to send encrypted data to a second input of MUX 360. Signature engines 340 are configured, via coupling 373, to send data integrity signatures to third input of MUX 360. MUX is controlled by control 330 to send one of unmodified data read from the SDRAM, encrypted data, or data integrity signatures to flash controller 320. Flash controller 320 may store the unmodified data read from the SDRAM, the encrypted data, or the data integrity signatures in a flash memory (not shown in FIG. 3A).

FIG. 3A illustrates a configuration for data flow and control of when a read from SDRAM (e.g., SDRAM 125) request is received from flash controller 320 by control 330. In an embodiment, this configuration and flow is used when a backup of SDRAM memory is required. In an embodiment, signature engines 340 and encrypt/decrypt engine 350 are used for both read and write requests. The data connections and flow for flash write requests (which corresponds to an SDRAM read) are illustrated in FIG. 3A. The data connections for flash read requests (which corresponds to an SDRAM write) are illustrated in FIG. 3B.

Flash controller 320 sends a read request to control 330. Encoded address lines (or a dedicated field) of the request are examined by control 330 to determine where to route the read data from that is being returned from SDRAM controller 310 and what data manipulation, if any, is required. In an embodiment, address bits [46:40] contain an encoding and a mapping that is as follows: bits 40-42 (SES[0:2]) specify which of 8 signature engines 340 should take the action specified (if any)

by the other bits of the encoding; bit 43 (SG) determines whether the specified signature engine should generate a data integrity signature using the read data as input; bit 44 (SO) tells the specified signature engine to output a data integrity signature (which, depending on the state of MUX 360, may be sent to flash controller 320 for storage); bit 45 (SR) resets the data integrity signature of the specified signature engine; and, bit 46 (E/D) determines whether encrypted data from the output of encryption/decryption engine 350 should be sent to flash controller 320.

Figure 4:
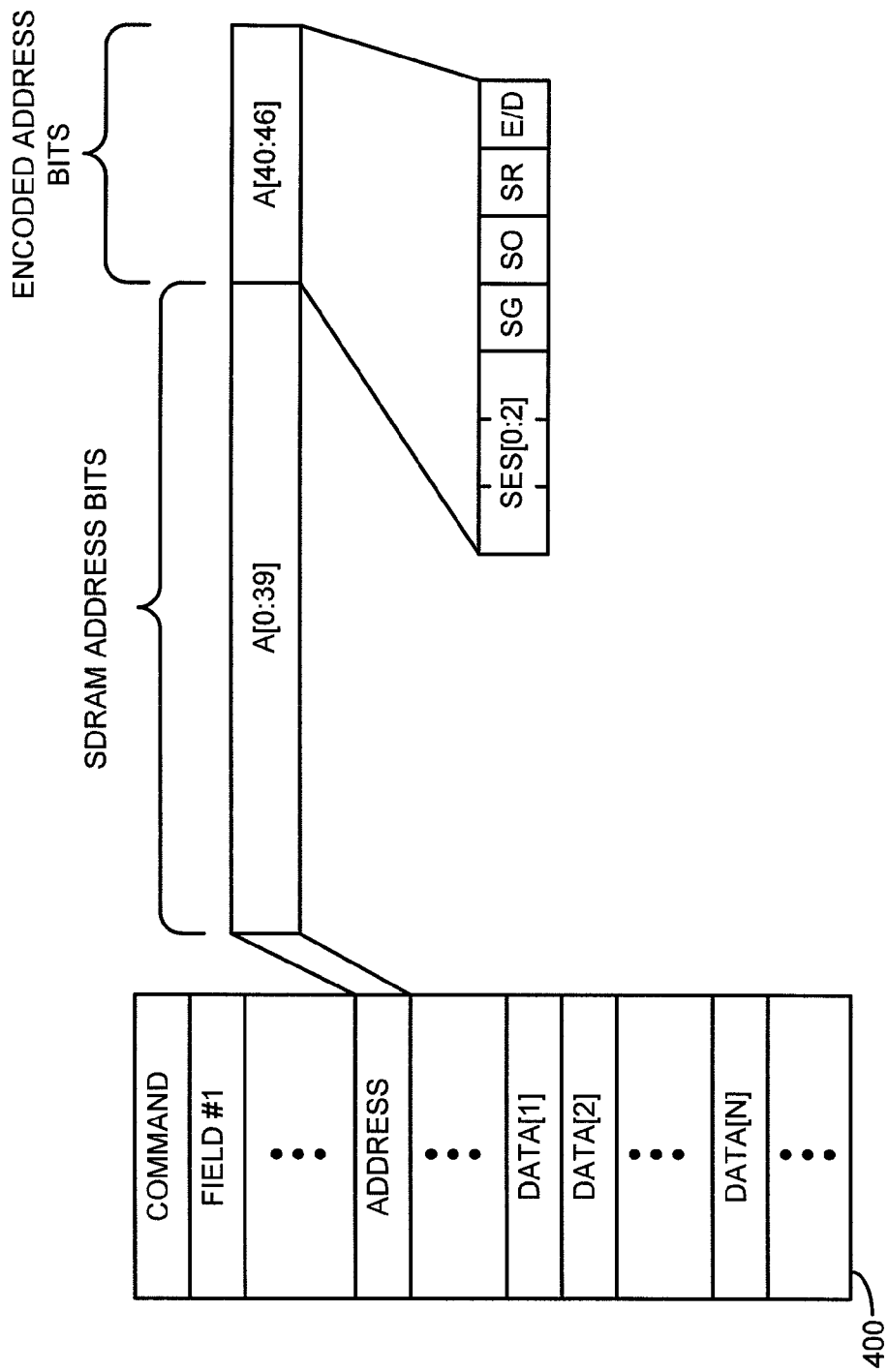
FIG. 4 is an illustration of a command data block (CDB).

FIG. 4 is an illustration of a command data block (CDB). In FIG. 4, an address field for address bits 0-46 is illustrated. Also illustrated is a field in the SDRAM address bits specifying the SDRAM address bits that are used (A[0:39]), and a field of the encoded address bits (A[40:46]). The individual bit fields (SES[0:2], SG, SO, SR, and E/D) of the encoded address bits are also illustrated.

As can be understood, based on the encoding of address bits 40-46, an indication will be sent to MUX 360 which results in one of three different sources being used by flash controller 320. The data will come either directly from SDRAM controller 310, encryption/decryption engine 350, or if a signature offload from one of signature engines 340. If the encoding indicates to perform encryption, encryption/decryption engine 350 will be controlled by control 330 to receive the read data from SDRAM controller 310. Once encryption/decryption engine 350 receives the data from SDRAM controller 310, it performs the data encryption, sends the result to MUX 360 for routing to flash controller 320, and waits for it to accept the data.

The encoding also indicates if signature generation should be done on the data being transferred to flash memory. One of the eight signature engines 340, as indicated by the signature engine select (SES[0:2]) field of the encoding, will be notified that its CRC/checksum signature value should be updated. In parallel with the data to being sent directly to flash controller 320, or to encryption/decryption engine 350, the data is also sent to at least the specified signature engine 340. Once the selected signature engine 340 sees the SDRAM data being accepted by either of those blocks, the current CRC/checksum signature is updated using that data. Finally, the encoding indicates if a signature offload should be output. If a Signature Offload is required, a read command will not be issued by control 330 to SDRAM controller 310. Instead, control 330 will instruct the selected signature engine 340 to send the data integrity signature data to flash controller 320.

In FIG. 3B, flash controller 320 is configured, via coupling 381, to send data read from a flash memory (not shown in FIG. 3B) to signature engines 340, encrypt/decrypt engine 350, and a first input of MUX 361. Encrypt/decrypt engine 350 is configured, via coupling 382, to send encrypted data to a second input of MUX 361. Signature engines 340 are configured, via coupling 383, to indicate a current value of a selected data integrity signature. MUX 361 is controlled by control 330 to send one of unmodified data read from the flash memory (via flash controller 320) or decrypted data to SDRAM controller 310. SDRAM controller 310 may store the unmodified data read from the flash memory, or the decrypted data in an SDRAM (not shown in FIG. 3B).

The data connections for flash read requests (which corresponds to an SDRAM write) are illustrated in FIG. 3B. In an embodiment, this flow is used when a restore of data back to SDRAM memory is required. Control 330 may receive a write command from flash controller 320. Control 330 may issue a write request to SDRAM controller 310. The encoded address lines of request are examined to determine where to route the write data from that is being sent to the SDRAM Controller (from flash controller 320) and what data manipulation, if any, is required. The same encoding described in the discussion of FIG. 3A may be used. Based on the encoding, either unmodified data from flash controller 320, or decrypted data from encryption/decryption engine 350 will be selected by MUX 361 to send to SDRAM controller 310. If the encoding indicates to perform decryption, encryption/decryption engine 350 will be controlled to accept the data from flash controller 320. Once the encryption/decryption engine 350 accepts the data from flash controller 320, it performs the data decryption, sends the result to the SDRAM controller 310, and waits for SDRAM controller 310 to accept the data. The encoding will also indicate if signature generation needs to be done for the data being transferred to SDRAM. One of the eight signature engines 340, as indicated by the SES[0:2] field of the encoding, is controlled to update its CRC/checksum signature value. The signature generation is always done on decrypted data. So the signature engine 340 is controlled to select between data from flash controller 320 or the decrypt results from encryption/decryption engine 350 to update the data integrity signature value. In parallel to the data to being sent to SDRAM controller 310 from either the flash controller or the encryption/decryption engine 350, the data will also be sent to a selected signature engine 340. Once the selected signature engine 340 sees the data being accepted by the SDRAM controller 310, the current CRC/Checksum Signature is updated using that data. Finally, the current value of one of the eight data integrity signatures can be selected and read by software via coupling 383. This value may be compared by software with a backup signature that is restored from flash memory to SDRAM. This may be done to verify that no data errors occurred while the data was backed up or restored.

Figure 5:
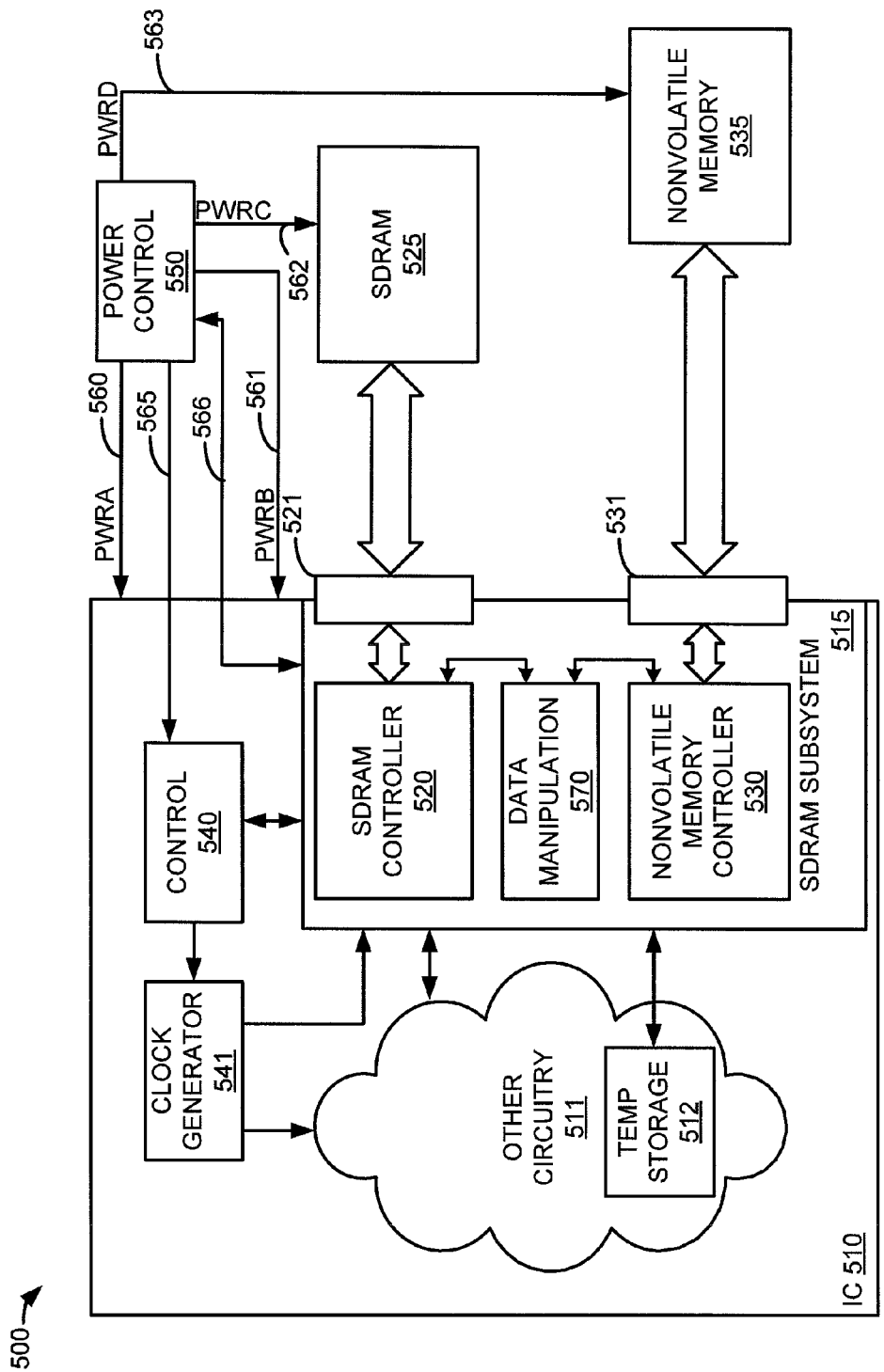
FIG. 5 a block diagram of a power isolation and backup system.

FIG. 5 is a block diagram of a power isolation and backup system. In FIG. 5, isolation and backup system 500 comprises: integrated circuit 510, power control 550, SDRAM 525, and nonvolatile memory (e.g., flash) 535. Integrated circuit (IC) 510 includes SDRAM subsystem 515, control 540, clock generator 541 and other circuitry 511. SDRAM subsystem 515 includes SDRAM controller 520, nonvolatile memory controller 530, and data manipulation 570. Other circuitry 512 may include temporary storage 512 (e.g., cache memory, buffers, etc.). SDRAM controller 520 interfaces with and controls SDRAM 525 via interface 521. Nonvolatile memory controller 530 interfaces with and controls nonvolatile memory 535 via interface 531. SDRAM subsystem 515 (and thus SDRAM controller 520, nonvolatile memory controller 530, and data manipulation 570) is operatively coupled to control 540, clock generator 541, other circuitry 511, and temporary storage 512. Clock generator 541 is operatively coupled to control 540 and other circuitry 511.

Power control 550 provides power supply A (PWRA) 560 to IC 510. Power control 550 provides power supply B (PWRB) 561 to SDRAM subsystem 515. Power control 550 provides power supply C (PWRC) 562 to SDRAM 525. Power control 550 provides power supply D (PWRD) 563 to nonvolatile memory 535. Power control 550 provides a power fail signal 565 to control 540. Power control 550 is also operatively coupled to SDRAM subsystem by signals 566.

In an embodiment, when power control 550 detects a power failure condition (either impending power fail or existing power fail) power control 550 notifies IC 510 of the condition via a power fail signal 565. This will starts a power isolation sequence to isolate SDRAM subsystem 515 from the rest of IC 510, and other circuitry 511, in particular. In an embodiment, the entire power isolation sequence is controlled by hardware (e.g., control 540, SDRAM subsystem 515, or both) with no interaction from software.

Upon receiving notification of a power fail condition, all of the interfaces (e.g., interfaces to other circuitry 511) connected to SDRAM subsystem 515 will be halted. On-chip temporary storage 512 will be flushed. It should be understood that although, in FIG. 5, temporary storage 512 is shown outside of SDRAM subsystem 515, temporary storage 512 may be part of SDRAM subsystem 515. In an example, temporary storage 512 may be a cache (e.g., level 1 cache, level 2 cache, level 3 cache), a posting buffer, or the like.

Once temporary storage 512 has been flushed, logic connected to SDRAM subsystem 515 indicates when the interfaces used for the flushes have halted. Once halted, these interfaces are not accepting any new cycles. Once all of the interfaces are halted, inputs that are required for external devices and internal core logic (i.e., other circuitry 511) are latched so that their state will not be lost when isolation occurs. Clocks that are not needed after the inputs are latched are gated off. The SDRAM subsystem will switch to internally generated clocks, or to clocks generated by a clock generator that shares power with SDRAM subsystem 515 (e.g., clock generator 541). Following this, inputs to SDRAM subsystem 515 not required for memory backup are isolated. In an embodiment, these inputs are driven to an inactive state.

After isolation of the inputs completes, SDRAM subsystem 515 (or control 540) signals (for example, using signals 566) power control 550 to remove PWRA 560. This results in power being turned off to all of IC 510 other than SDRAM subsystem 515. SDRAM subsystem 515 is on a separate power plane from at least other circuitry 511. This allows power to be maintained (i.e., by PWRB 561) to the SDRAM subsystem until power is totally lost to isolation and backup system 500.

In addition to controlling the isolation and removal of power to all but the SDRAM subsystem 515 (and any other logic needed by SDRAM subsystem 515), once the interfaces have halted and temporary storage 512 been flushed, internal memory backup logic will start moving data from SDRAM 525 to nonvolatile memory 535. In an embodiment, these are the only cycles running on the entire chip once PWRA has been removed.

In an embodiment, as data is moved to or from SDRAM 525, from or to, respectively, nonvolatile memory 535, it may be manipulated by data manipulation 570. Data manipulation 570 is configured, operates, and functions as in the same manner described previously with reference to data manipulation system 300 of FIGS. 3A and 3B. Thus, in short, data manipulation 570 can be configured to encrypt/decrypt data, and/or calculate/check data integrity signatures. In an embodiment, the functions, data flow, and configuration of data manipulation 570 may be performed while PWRA 560 is off (for example to save encrypted data and/or calculate and store a data integrity signature.) In another embodiment, the functions, data flow, and configuration of data manipulation 570 may be performed while PWRA 560 is on (for example to restore encrypted data and/or calculate and store a data integrity signature.)

Figure 6:
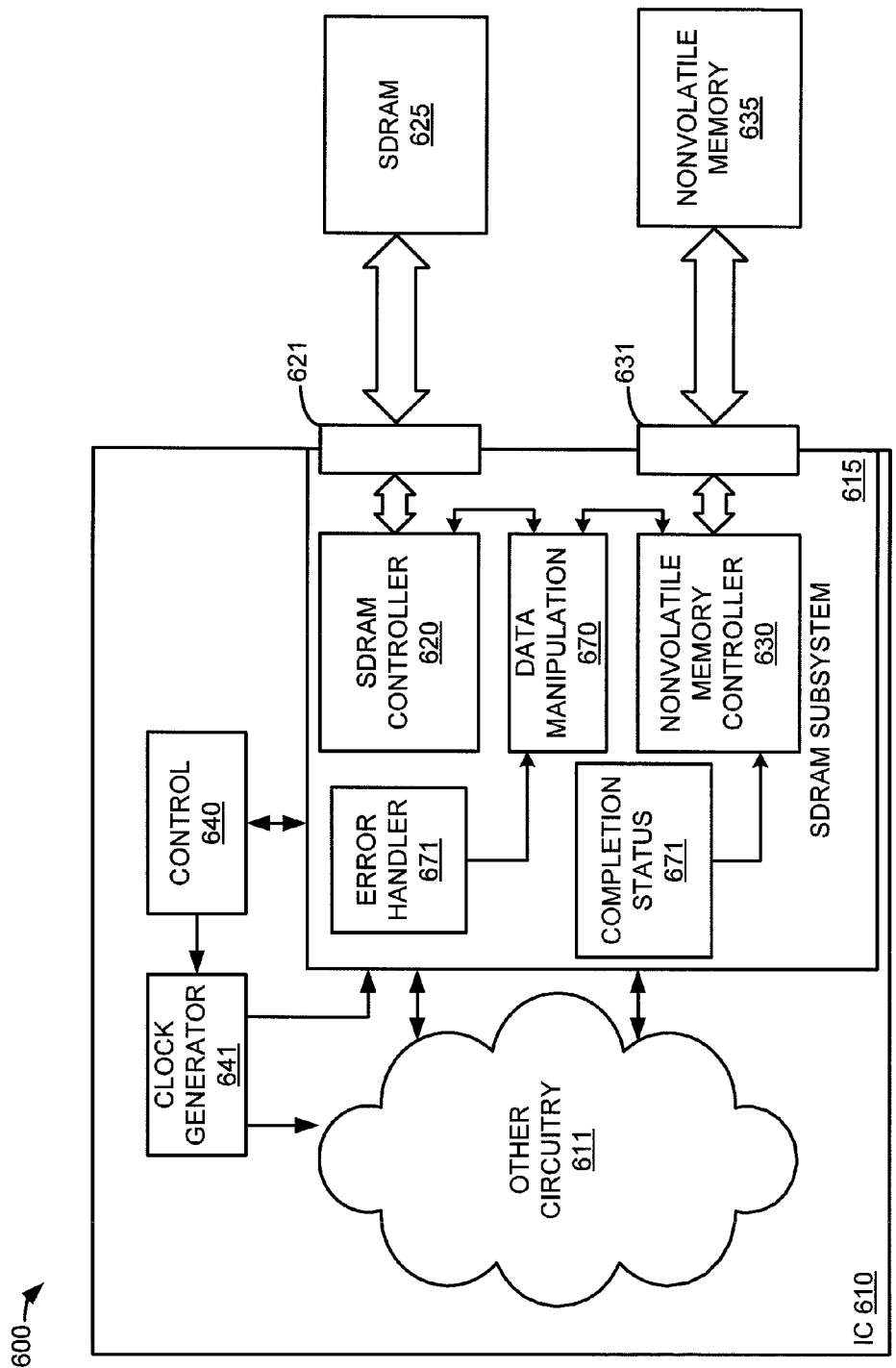
FIG. 6 is a block diagram of a memory backup system.

FIG. 6 is a block diagram of a memory backup system. In FIG. 6, memory backup system 600 comprises: integrated circuit 610, SDRAM 625 (volatile memory), and nonvolatile memory (e.g., flash) 635. Integrated circuit (IC) 610 includes SDRAM subsystem 615, control 640, clock generator 641 and other circuitry 611. SDRAM subsystem 615 includes SDRAM controller 620, nonvolatile memory controller 630, data manipulation 670, error handler 671, and completion status 671. SDRAM controller 620 interfaces with and controls SDRAM 625 via interface 621. Nonvolatile memory controller 630 interfaces with and controls nonvolatile memory 635 via interface 631. SDRAM subsystem 615 (and thus SDRAM controller 620, nonvolatile memory controller 630, data manipulation 670, error handler 671, and completion status 671) is operatively coupled to control 640, clock generator 641, and other circuitry 611. Clock generator 641 is operatively coupled to control 640 and other circuitry 611.

In an embodiment, upon instruction by control 640, or some other event, internal memory backup logic moves data from SDRAM 625 to nonvolatile memory 635. In an embodiment, these are the only cycles running on the entire chip 610 in the case of a power fail backup. As data is moved to or from SDRAM 625, from or to, respectively, nonvolatile memory 635, it may be manipulated by data manipulation 670. Data manipulation 670 is configured, operates, and functions much in the same manner described previously with reference to data manipulation system 300 of FIGS. 3A and 3B, and to be described data manipulation system of FIG. 8, below. Thus, in short, data manipulation 670 can be configured to encrypt/decrypt data, and/or calculate/check data integrity signatures. In an embodiment, the functions, data flow, and configuration of data manipulation 670 may be performed while at least one (but not all) power supply to IC 610 is off (for example to save encrypted data and/or calculate and store a data integrity signature.) In another embodiment, the functions, data flow, and configuration of data manipulation 670 may be performed while the power to IC 610 is in a normal state (for example to restore encrypted data and/or calculate and store a data integrity signature.)

In an embodiment, as data is moved between SDRAM 625 and nonvolatile memory 635, an indicator may be received that determines whether the data should be included in the generation of a data integrity signature. This indicator may be part of a CDB, described previously or internal register value(s). For memory backup (i.e., of the contents of SDRAM 625) a signature value may be calculated by data manipulation 670. This signature value may be sent by data manipulation 670 to nonvolatile memory controller 630 to be stored in nonvolatile memory 635. For memory restore (i.e., of the contents of SDRAM 625 from data stored in nonvolatile memory 635) a new signature value can be calculated by data manipulation 670. This new signature value can be compared with the signature value that was stored during the memory backup to determine if the data associated with the signature is good or bad.

As described previously, as data is sent to nonvolatile memory 635, data manipulation 670 sends the data to a signature engine to calculate a CRC/checksum value. In an embodiment, data manipulation 670 has eight (8) different signature engines that can run in parallel with each other. (It should be understood that a greater or lesser number of signature engines may be included in data manipulation 670, depending upon the application.) When data (or a data block) is to be included in the generation of a particular signature value, an additional indication may be received that specifies which of the data signature engines the data is sent to. In an embodiment, this additional indication may be included in a CDB. In another embodiment, this additional indication may be included in an address field of a CDB, as described previously.

The multiple addressable data signature engines allow multiple different data streams to be passing through data manipulation 670 interleaved with each other and each using a different signature engine in order to calculate unique data integrity signatures. At any point while a data stream is being passed through data manipulation 670, a currently calculated signature value can be sent to nonvolatile memory 635 (or compared with a value received from nonvolatile memory 635). This allows the option of storing one signature value for an entire data stream, or to have multiple signature values stored for portions (or blocks) of the stream. In an embodiment, when an indication to send a signature value is received, no data is moved from SDRAM 625 to nonvolatile memory 635. Instead, the selected signature value is sent to nonvolatile memory 635.

In an embodiment, while data is being moved from SDRAM 625 to nonvolatile memory 635 (or visa versa), an error internal (or external) to IC 610 may occur. Examples of the types of errors that may occur (and be signaled) include data parity errors, internal bus errors, ECC errors, etc. These errors may be communicated to error handler 671. In an embodiment, the data is being moved as part of a memory backup being performed in response to a power failure. In this case, power is going to be lost so an error indication stored internal to IC 610 would be lost. Thus, in an embodiment, when error handler 671 receives an indication of an error, the signature value associated with the indicated error may be corrupted. For example, a bit, bits, byte, or bytes (e.g., the lowest order 8 bits) of the signature value may be inverted to corrupt the signature value. The manipulation of data and calculation of the signature value (now corrupted) may then proceed normally. However, because the signature value was corrupted during processing (because of the error condition), a corrupted signature value will be stored in nonvolatile memory 635. This provides a means to indicate that an internal error condition occurred while the data was being transferred (e.g., during memory backup). Thus, when the data is restored from nonvolatile memory 635, the newly calculated signature value for the restore will not match the signature value stored in nonvolatile memory 635. This lack of a match generates an error condition during the restore operation.

In an embodiment, an end signature may be written by completion status 671 to determine if the data transfer (or backup) from SDRAM 625 to nonvolatile memory 635 completed successfully. Completion status 671 may store a completion signature value in a predetermined location in nonvolatile memory 635 and/or SDRAM 625. The completion signature value may be an arbitrary value. In an embodiment, the completion signature value is selected to be unique for every power failure that occurs. For example, the completion signature may be a value that is incremented every time a data transfer (or backup) occurs. In another example, the completion signature may be a value representing the date, day of year, time, etc.

In an embodiment, the completion signature value is stored in SDRAM 625. The completion signature may be stored in a location in SDRAM 625 such that it is the last data moved from SDRAM to nonvolatile memory 635. In this manner, the completion signature is stored at the end of each data stream that is moved to nonvolatile memory 635 and may be considered the end signature for each data stream copied into SDRAM 625. When data is restored back to SDRAM 625 from nonvolatile memory 635, the value stored at the end of the stream may be compared to the completion signature value stored at the predetermined location in nonvolatile memory 635. If the values compare equal, the memory transfer (i.e., backup) completed successfully (i.e., before power was lost). If the value compare not equal, the memory transfer (i.e., backup) did not complete successfully (i.e., it did not complete before power was lost, or it never started and the data in nonvolatile memory 635 is from a previous transfer). In this latter case, the entire data stream associated with the completion signature may be considered to be incorrect.

It should be understood that memory backup system 600 allows for the detection of both internal and external errors as data is being backed up. If an internal (to IC 610) error is detected, that indication can be stored. This error indication can be stored even though power to IC 610 is going away (or is at least partially gone). Memory backup system 600 also helps ensure that when data is restored back to SDRAM 625, no bad data will be used. The completion signature of memory backup system 600 helps ensure that the backup of all of the data to nonvolatile memory 635 completed successfully. The completion signature of memory backup system 600 also helps ensure that the data in nonvolatile memory 635 is for the current power loss (or shutdown). Memory backup system 600 uses the combination of data integrity signature(s) and completion signature(s) to help ensure that no bad or old data will be used when processes that rely on the contents of SDRAM 625 try to restart from a point when power was lost (or the system shut down).

It should also be understood that memory backup system 600 provides the flexibility to store multiple data signatures with the data. This allows the data associated with different applications to be divided up amongst different signatures. When a restore of the data is performed, and a signature check indicates bad data, only the data associated with that signature check is deemed lost. The rest of the data should be good after the restore completes. This gives a higher probability that at least some application will be able to start up where they left off when power was lost. Finally, it should be understood that multiple signature engines calculating multiple signature values in parallel allows multiple data streams to be transferred at the same time (or interleaved). In addition, this parallelism isolates dependencies between data streams because a single signature is only being calculated for a particular data stream.

Figure 7:
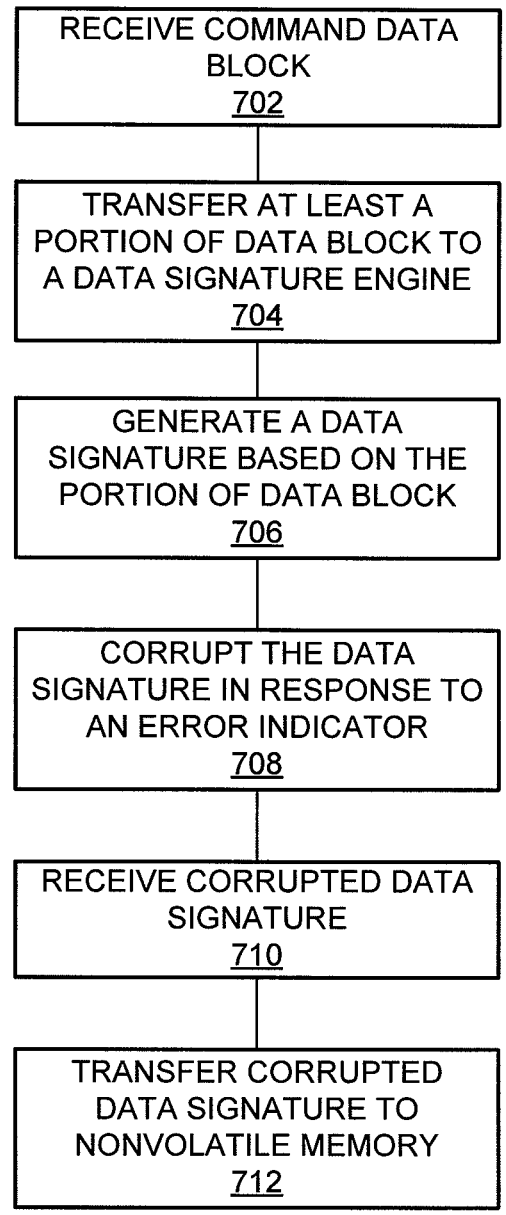
FIG. 7 is a flowchart illustrating a method of communicating an internal error.

FIG. 7 is a flowchart illustrating a method of communicating an internal error. The steps illustrated in FIG. 7 may be performed by one or more elements of isolation and backup system 100, data manipulation system 300, isolation and backup system 500, or memory backup system 600. In FIG. 7, a command data block is received (702). For example, SDRAM subsystem 615 may receive a command data block. This command data block may follow the format and contain the information described in the discussion of FIG. 4. At least a portion of a data block is transferred to a data signature engine (704). For example, at least a portion of a data stream may be transferred from SDRAM 625 to data manipulation 670. A data signature based on the portion of the data block is generated (706). For example, data manipulation 670 may generate an intermediate data signature, based on only a portion of a data block, as part of its calculation of a final data signature. The final data signature would ordinarily be stored in nonvolatile memory 635.

In response to an error indicator, the data signature is corrupted (708). For example, data manipulation 670, in response to a signal from error handler 671 (or another signal from somewhere on IC 610) may corrupt the intermediate data signature. One way data manipulation 670 may corrupt the intermediate data signature is to invert the low order byte of the intermediate data signature. SDRAM subsystem may then continue to supply data to data manipulation 670. This data may be used to continue to calculate a data integrity signature. However, this data integrity signature will be based on a corrupt intermediate data signature value. Thus, the final data integrity signature value will also be corrupt.

A corrupted data signature is received (710). For example, nonvolatile memory controller 630 may receive a corrupted final data signature value from data manipulation 670. The corrupted data signature is transferred to nonvolatile memory (712). For example, nonvolatile memory controller 630 may transfer the corrupted final data signature value it received from data manipulation 670 to nonvolatile memory 635 for storage. Thus, as described previously, when SDRAM system 615 retrieves the corrupted data signature value, it will communicate to SDRAM system 615 that an error occurred while the transfer (i.e. backup) of data from SDRAM 625 was taking place.

Figure 8:
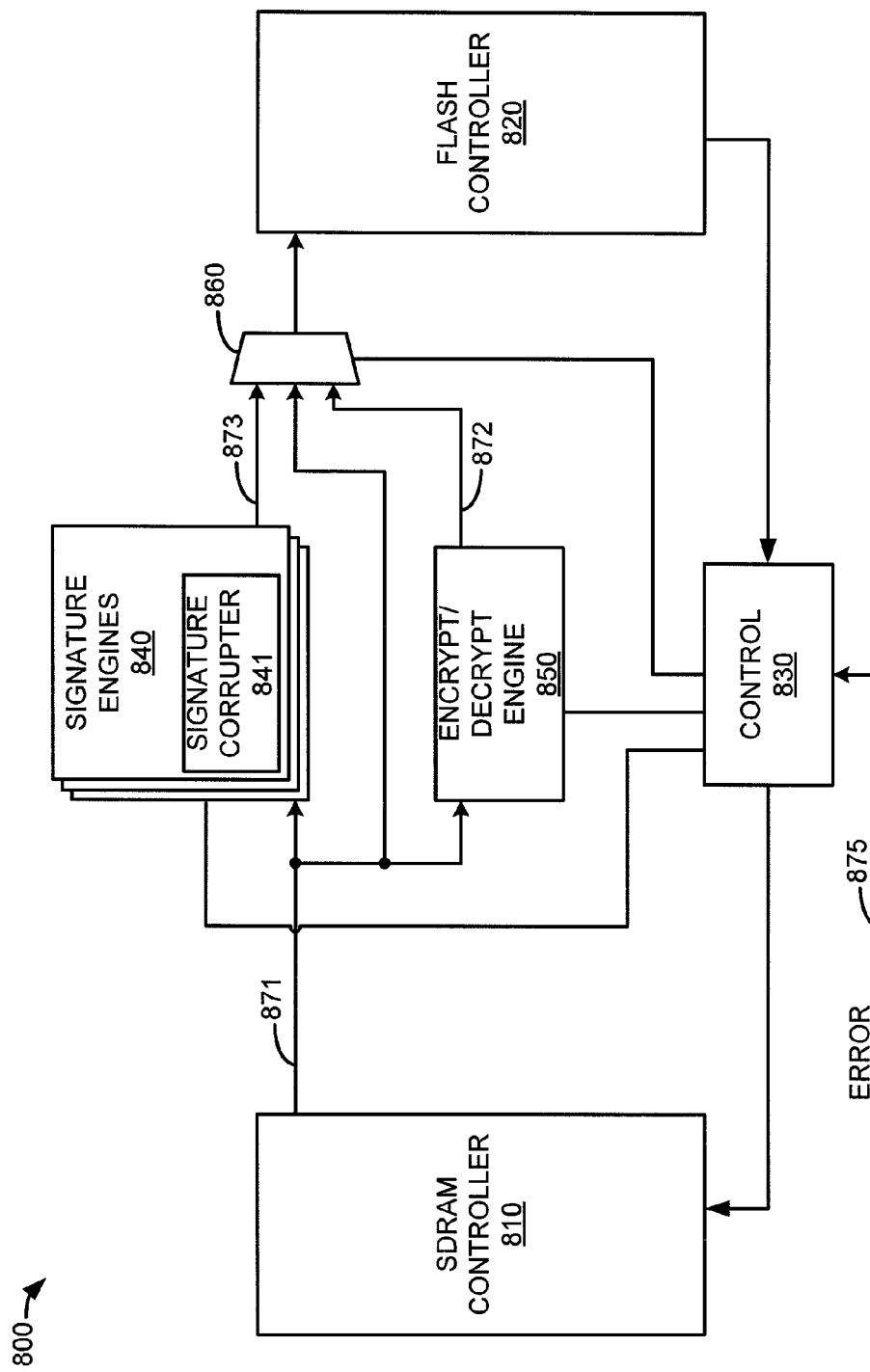
FIG. 8 is a block diagram of a data manipulation system configuration.

FIG. 8 is a block diagram of a data manipulation system configuration. In FIG. 8, data manipulation system 800 comprises: SDRAM controller 810, flash controller 820, control 830, signature engines 840, encrypt/decrypt engine 850, and multiplexer (MUX) 860. Control 830 is operatively coupled to SDRAM controller 810, flash controller 820, signature engines 840, and encrypt/decrypt engine 850, and MUX 860. Control 830 also receives an indicator of an error condition 875. Control 830 may also receive commands, signals, CDBs, etc. from flash controller 820, perform arbitration, and otherwise manage the data flows and configuration of data manipulation system 800.

In FIG. 8, SDRAM controller 810 is configured, via coupling 871, to send data read from an SDRAM (not shown in FIG. 8) to signature engines 840, encrypt/decrypt engine 850, and a first input of MUX 860. Encrypt/decrypt engine 850 is configured, via coupling 872, to send encrypted data to a second input of MUX 860. Signature engines 840 include a signature corrupter 841. Signature corrupter 841, in response to a signal from control 830, may corrupt an intermediate or final data signature value stored in one or more signature engines 840. Control 830 may signal one or more signature corrupters to corrupt an intermediate or final data signature value in response to receiving an indication of an error condition from indicator 875.

Signature engines 840 are configured, via coupling 873, to send data integrity signatures to third input of MUX 860. MUX is controlled by control 830 to send one of unmodified data read from the SDRAM, encrypted data, data integrity signatures, or at least one corrupted data integrity signature, to flash controller 820. Flash controller 820 may store the unmodified data read from the SDRAM, the encrypted data, data integrity signatures, or a corrupted data integrity signature, in a flash memory (not shown in FIG. 8). FIG. 8 illustrates a configuration for data flow and control of when a read from SDRAM (e.g., SDRAM 625) request is received from flash controller 820 by control 830. In an embodiment, this configuration and flow is used when a backup of SDRAM memory is required.

The methods, systems and devices described above may be implemented in computer systems, or stored by computer systems. The methods described above may also be stored on a computer readable medium. Devices, circuits, and systems described herein may be implemented using computer-aided design tools available in the art, and embodied by computer-readable files containing software descriptions of such circuits. This includes, but is not limited to isolation and backup system 100 and 500; memory backup system 600; IC 110, 510, and 610; power control 150 and 550; SDRAM subsystems 115, 515, and 615; and their components. These software descriptions may be: behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 9:
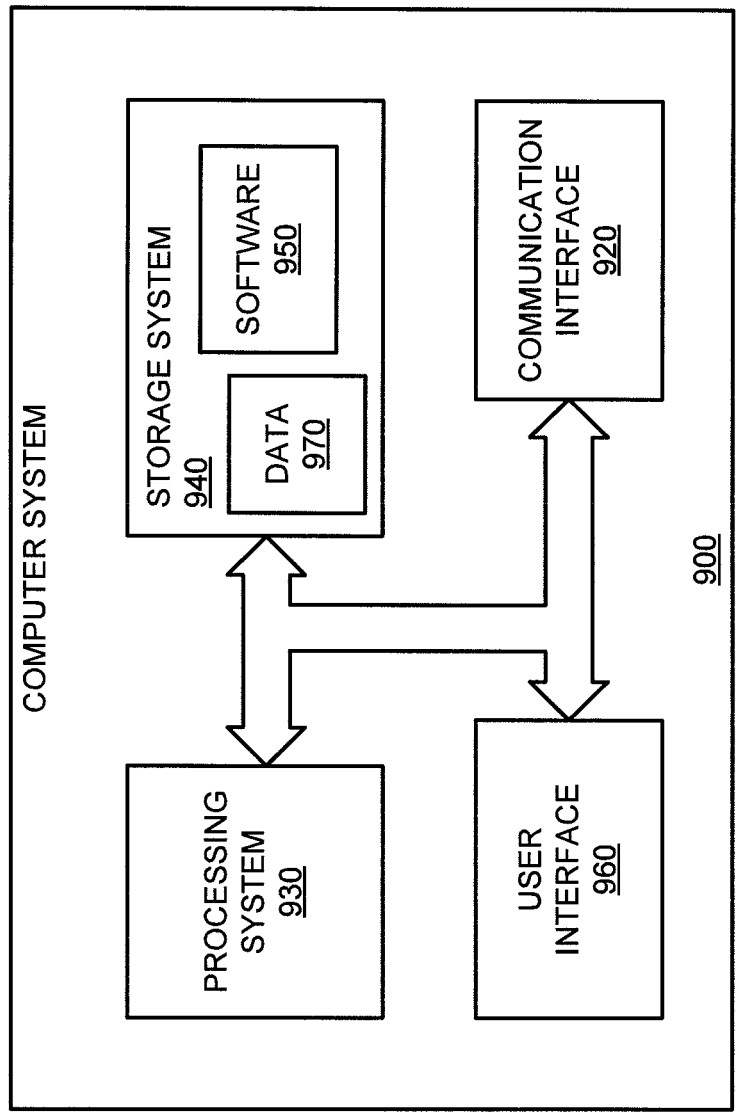
FIG. 9 is a block diagram of a computer system.

FIG. 9 illustrates a block diagram of a computer system. Computer system 900 includes communication interface 920, processing system 930, storage system 940, and user interface 960. Processing system 930 is operatively coupled to storage system 940. Storage system 940 stores software 950 and data 970. Processing system 930 is operatively coupled to communication interface 920 and user interface 960. Computer system 900 may comprise a programmed general-purpose computer. Computer system 900 may include a microprocessor. Computer system 900 may comprise programmable or special purpose circuitry. Computer system 900 may be distributed among multiple devices, processors, storage, and/or interfaces that together comprise elements 920-970.

Communication interface 920 may comprise a network interface, modem, port, bus, link, transceiver, or other communication device. Communication interface 920 may be distributed among multiple communication devices. Processing system 930 may comprise a microprocessor, microcontroller, logic circuit, or other processing device. Processing system 930 may be distributed among multiple processing devices. User interface 960 may comprise a keyboard, mouse, voice recognition interface, microphone and speakers, graphical display, touch screen, or other type of user interface device. User interface 960 may be distributed among multiple interface devices. Storage system 940 may comprise a disk, tape, integrated circuit, RAM, ROM, network storage, server, or other memory function. Storage system 940 may be a computer readable medium. Storage system 940 may be distributed among multiple memory devices.

Processing system 930 retrieves and executes software 950 from storage system 940. Processing system may retrieve and store data 970. Processing system may also retrieve and store data via communication interface 920. Processing system 930 may create or modify software 950 or data 970 to achieve a tangible result. Processing system may control communication interface 920 or user interface 960 to achieve a tangible result. Processing system may retrieve and execute remotely stored software via communication interface 920.

Software 950 and remotely stored software may comprise an operating system, utilities, drivers, networking software, and other software typically executed by a computer system. Software 950 may comprise an application program, applet, firmware, or other form of machine-readable processing instructions typically executed by a computer system. When executed by processing system 930, software 950 or remotely stored software may direct computer system 900 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of increasing data integrity in at least one of a plurality of data blocks stored in a nonvolatile memory, comprising:
    receiving a first command data block having a first plurality of bits that indicate a first location in said volatile memory and a second plurality of bits that indicate a first selected data signature engine;
    transferring at least a portion of a first one of said plurality of data blocks from said volatile memory to said first selected data signature engine;
    generating, in said first selected data signature engine, a first data integrity signature based on said at least said portion of said first one of said plurality of data blocks transferred from said volatile memory;
    in response to an indicator that an internal error condition occurred during said transferring, corrupting said first data integrity signature to create a corrupted data signature;
    receiving said corrupted data signature from said first selected data signature engine; and,
    transferring said corrupted data signature to said nonvolatile memory.

2. The method of claim 1, wherein said corrupting comprises inverting at least one bit of said data integrity signature.

3. The method of claim 1, wherein said corrupting comprises inverting at least one byte of said data integrity signature.

4. The method of claim 1, further comprising:
    transferring an indicator of a completion status to said nonvolatile memory.

5. The method of claim 1, further comprising:
    receiving a second command data block having said first plurality of bits that indicate a second location in said volatile memory and said second plurality of bits that indicate a second selected data signature engine;
    transferring at least a portion of a second one of said plurality of data blocks from said volatile memory to said selected data signature engine; and,
    generating, in said second selected data signature engine, a first data integrity signature based on said at least said portion of said second one of said plurality of data blocks transferred from said volatile memory.

6. The method of claim 5, wherein said second data integrity signature is not corrupted in response to said indicator that an internal error condition occurred.

7. The method of claim 6, further comprising:
    transferring an indicator of a completion status to said nonvolatile memory.

8. A method of transferring data between a nonvolatile memory and a volatile memory, comprising:
    receiving a command data block having a memory address field, said memory address field having a first plurality of bits that indicate a location in said volatile memory and a second plurality of bits that indicate a data signature engine;
    based on said indicated data signature engine, transferring data from said volatile memory to said indicated data signature engine;
    receiving an error indicator that indicates that an internal error condition occurred during said transferring;
    based on said error indicator, corrupting an interim data signature value associated with said indicated data signature engine; and,
    transferring a data signature based on said corrupted interim data signature value to said nonvolatile memory.

9. The method of claim 8, wherein said corrupting comprises inverting at least one bit of said data integrity signature.

10. The method of claim 8, wherein said corrupting comprises inverting at least one byte of said data integrity signature.

11. The method of claim 8, further comprising:
    transferring an indicator of a completion status to said nonvolatile memory.

12. An integrated circuit, comprising:
    a data signature engine, a first data integrity signature based on at least portion of a first one of a plurality of data blocks transferred from a volatile memory;
    a data manipulation controller that receives a first command data block having a first plurality of bits that indicate a first location in said volatile memory and a second plurality of bits that indicate said data signature engine, said data manipulation controller, in response to an indicator that an internal error condition occurred during a transferring of said one of said plurality of data blocks transferred from said volatile memory, to corrupt said first data integrity signature to create a corrupted data signature;
    a volatile memory controller to be coupled to a volatile memory, said volatile memory controller to facilitate the transfer of data from said volatile memory to said data signature engine; and,
    a nonvolatile memory controller to be coupled to said nonvolatile memory, the nonvolatile memory controller to receive said corrupted data signature from said data signature engine and transfer said corrupted data signature to said nonvolatile memory.

13. The integrated circuit of claim 12, wherein said corrupting comprises inverting at least one bit of said data integrity signature.

14. The integrated circuit of claim 12, wherein said corrupting comprises inverting at least one byte of said data integrity signature.

15. The integrated circuit of claim 12, wherein said data manipulation controller transfers an indicator of a completion status to said nonvolatile memory.

16. A computer readable medium having instructions stored thereon for increasing data integrity that, when executed by a computer, at least instruct the computer to:
    receive a first command data block having a first plurality of bits that indicate a first location in a volatile memory and a second plurality of bits that indicate a first selected data signature engine;
    transfer at least a portion of a first one of a plurality of data blocks from said volatile memory to said first selected data signature engine;
    generate, in said first selected data signature engine, a first data integrity signature based on said at least said portion of said first one of said plurality of data blocks transferred from said volatile memory;
    in response to an indicator that an internal error condition occurred during said transfer, corrupt said first data integrity signature to create a corrupted data signature;
    receive said corrupted data signature from said first selected data signature engine; and,
    transfer said corrupted data signature to said nonvolatile memory.

17. The computer readable medium of claim 16, wherein corrupting comprises inverting at least one bit of said data integrity signature.

18. The computer readable medium of claim 16, wherein corrupting comprises inverting at least one byte of said data integrity signature.

19. The computer readable medium of claim 16, wherein the computer is further instructed to:
- transfer an indicator of a completion status to said nonvolatile memory.

20. The computer readable medium of claim 16, wherein the computer is further instructed to:
- receive a second command data block having said first plurality of bits that indicate a second location in said volatile memory and said second plurality of bits that indicate a second selected data signature engine;
- transfer at least a portion of a second one of said plurality of data blocks from said volatile memory to said selected data signature engine; and,
- generate, in said second selected data signature engine, a first data integrity signature based on said at least said portion of said second one of said plurality of data blocks transferred from said volatile memory.

* * * * *